United States Patent Office.

DENNISON WILLARD, JR., OF PITTSFORD, NEW YORK.

Letters Patent No. 94,460, dated August 31, 1869.

IMPROVED MODE OF CLEANING MUSTY BEER AND OTHER CASKS.

The Schedule referred to in these Letters Patent and making part of the same.

*To all whom it may concern:*

Be it known that I, DENNISON WILLARD, Jr., of Pittsford, in the county of Monroe, and State of New York, have invented a new and useful Improvement in Cleansing Musty Casks; and I do hereby declare that the following is a full, clear, and exact description thereof.

The nature of my invention consists in the employment of loam, sand, clay, or other earths, or a mixture of any variety of soil, for the purpose of removing must or mould from beer and other casks; and To enable others to understand the same, I will describe the process.

It is well known that many casks, particularly those used for malt-liquors, become useless from mould or must, which penetrates the wood, and has hitherto been difficult and generally impossible to remove, except at an unwarranted expense, so that the casks are valueless for anything but fuel. In some cases they are taken to pieces, and the inner surface of the staves and heads entirely removed; but even this is not effectual, and, besides being expensive, soon uses up the casks.

To accomplish the desired object, I remove one head of the tainted casks, and wash them thoroughly, both inside and outside, with clear cold water, which removes all fetid matter which may be clinging to the surface.

The casks are now entirely filled with any fine earth, such as loam, fine gravel, sand, or clay, or any mixture of these materials, and allowed to stand several days, with the loose heads either laid upon the earth, or covered with it. The length of time required to purify them depends upon the degree or depth of the taint; but it may be from one to two weeks, more or less.

After removing the earth, the casks are again washed with cold water, when they will be found perfectly sweet, and fit for use.

I have cleansed casks that were badly tainted in four days, but a longer time may in many cases be necessary.

If so desired, the usual practice of scalding and rinsing with lime-water may be adopted after the above process, but such treatment is not necessary.

It is desirable that the earth used should be quite fine, that it may come in contact with every part of the inner surface of the casks.

It is obvious that my process is very simple, and will cost comparatively nothing, since the labor can be done by men already employed by breweries and like establishments, and the earth, after being exposed to the atmosphere for a short time, may be used repeatedly.

What I claim as my invention, and desire to secure by Letters Patent, is—

As an improvement in the process of cleansing musty beer and other casks, the employment of the material herein set forth.

DENNISON WILLARD, Jr.

Witnesses:
WM. S. LOUGHBOROUGH,
F. H. CLEMENT.